US007525825B2

(12) United States Patent
Korich et al.

(10) Patent No.: US 7,525,825 B2
(45) Date of Patent: Apr. 28, 2009

(54) SNAP IN HIGH POWER, HIGH CURRENT CONNECTOR WITH INTEGRATED EMI FILTERING

(75) Inventors: Mark D. Korich, Chino Hills, CA (US); Mark L Selogie, Hermosa Beach, CA (US); Constantin C. Stancu, Anaheim, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 458 days.

(21) Appl. No.: 11/218,367

(22) Filed: Sep. 2, 2005

(65) Prior Publication Data

US 2007/0052500 A1 Mar. 8, 2007

(51) Int. Cl.
*H02J 1/02* (2006.01)

(52) U.S. Cl. ............................ 363/39; 363/17; 363/40; 310/51; 310/68 R; 307/10.1

(58) Field of Classification Search .................. 363/34, 363/35, 39, 40, 55, 109; 307/2, 10.1, 91, 307/107, 108; 310/54, 68 R, 89, 154.14, 310/159; 361/328
See application file for complete search history.

(56) References Cited

U.S. PATENT DOCUMENTS

| | | | | |
|---|---|---|---|---|
| 5,491,370 | A * | 2/1996 | Schneider et al. | 310/54 |
| 5,552,976 | A * | 9/1996 | Munro et al. | 363/39 |
| 6,078,117 | A * | 6/2000 | Perrin et al. | 310/68 R |
| 6,326,704 | B1 * | 12/2001 | Breed et al. | 307/9.1 |
| 6,538,902 | B1 * | 3/2003 | Beard | 361/818 |
| 7,205,860 | B2 * | 4/2007 | Axelrod et al. | 333/12 |
| 2004/0257841 | A1 * | 12/2004 | Taguchi et al. | 363/40 |
| 2006/0022329 | A1 * | 2/2006 | Jordan | 257/701 |

* cited by examiner

*Primary Examiner*—Akm E Ullah
*Assistant Examiner*—M'baye Diao

(57) ABSTRACT

A filter assembly is provided which includes a Faraday cage interface. Electrical noise is filtered by the Faraday cage interface. The Faraday cage interface is configured to prevent passage of electromagnetic waves.

14 Claims, 3 Drawing Sheets

SNAP IN HIGH POWER, HIGH CURRENT CONNECTOR WITH INTEGRATED EMI FILTERING

TECHNICAL FIELD

The present invention generally relates to electric motors and, more particularly, to connectors for inverter modules.

BACKGROUND

Electric and hybrid vehicles typically include an alternating current (AC) electric motor which is driven by a direct current (DC) power source, such as a storage battery. The AC electric motor is relatively high power typically being on the order to hundreds of thousands of Watts. Motor windings of the AC electric motor can be coupled to inverter module(s) which convert the DC power to AC power which drives the AC electric motor.

FIG. 1 is a schematic diagram of a conventional inverter system. The system includes an inverter module 20 and an interconnection system 35. The interconnection system 35 comprises an Electromagnetic Interference (EMI) core 30 and an EMI filter apparatus 25.

The inverter module 20 is coupled to the interconnection system 35 by a pair of bus bars 32. The EMI core 30 is located between the EMI filter apparatus 25 and is disposed around the bus bars 32.

The EMI filter apparatus 25 includes an EMI filter card 40 and a pair of bolts 50, 52 which include a positive terminal (+) bolt 50 and a negative terminal (−) bolt 52 for coupling to a DC power source. The EMI core 30 is coupled to the bolts 50 by the bus bars 32. The EMI filter card 40 is also coupled between ground and the bus bars 32 via a pair of wires 34.

The inverter module 20 includes a number of transistors (not shown). Transistors in the inverter module 20 switch on and off relatively rapidly (e.g., 5 to 20 kHz). This switching tends to generate electrical switching noise. The electrical switching noise should ideally be contained inside the inverter module 20 and prevented from entering rest of system to prevent interference with other electrical components in the vehicle. It is desirable to reduce the EMI noise produced by the system.

This configuration requires a large number of components and can be relatively costly to manufacture. The EMI filter apparatus 25 consumes valuable space since the EMI filter card 40 is a relatively large, separate component. This configuration is also susceptible to electrical or EMI noise because it uses a separate connection to the bus bars 32 via the wires 34.

Notwithstanding these advances, there is a need for high current/power, low EMI noise inverter systems. It would be desirable to provide techniques for reducing EMI noise in the inverter system. It would also be desirable to reduce the cost and size of such inverter systems to provide a low-cost, compact inverter system which utilizes fewer parts. It would also be desirable to reduce and possibly eliminate the number of interconnections needed between components of the inverter system. There is also a need for a high current, low EMI noise connection system which can be used, for example, to couple the bus bars to the inverter system. It would also be desirable to reduce the size of the EMI filtering apparatus and the amount or number of capacitors needed for filtering. Other desirable features and characteristics of the present invention will become apparent from the subsequent detailed description and the appended claims, taken in conjunction with the accompanying drawings and the foregoing technical field and background.

SUMMARY

A low noise inverter system is provided comprising an inverter module, a bus bar, and a connector for coupling the bus bar to the inverter module. The connector comprises a filter assembly which can receive an input having a noise component, and can filter the noise component of the input to produce a filtered input. In one implementation, the filter assembly comprises a connector pin and a Faraday cage interface. The connector pin can be coupled to the bus bar, and can receive the input having the noise component. The Faraday cage interface may be disposed at least partially around the connector pin to reduce the noise component associated with the input.

BRIEF DESCRIPTION OF THE DRAWINGS

The present invention will be described in conjunction with the following drawing figures, wherein like numerals denote like elements.

DETAILED DESCRIPTION

Figure 1:
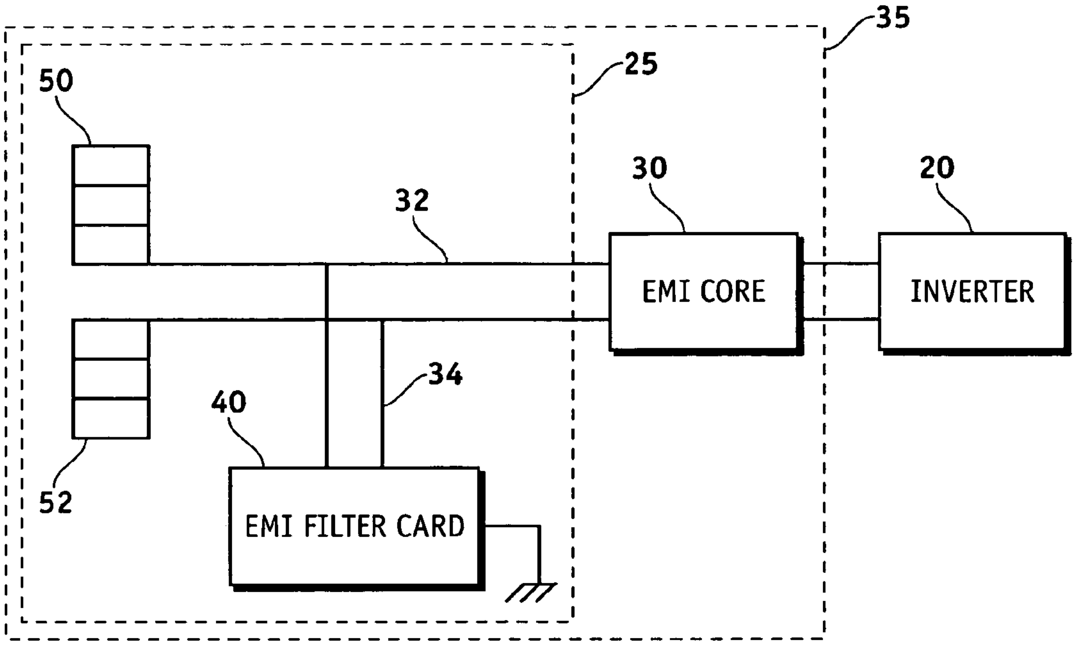
FIG. 1 is a block diagram of a conventional inverter system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Definitions

As used herein, the word “exemplary” means “serving as an example, instance, or illustration.” Any embodiment described herein as “exemplary” is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, the term “winding” refers to one or more turns of a conductor wound in the form of a coil. A winding may refer to coils that are wound around a conductor (core) which produce electrical energy if moved within a magnetic field. In an AC induction motor, the primary winding is a stator or wire coils inserted into slots within steel laminations. The secondary winding of an AC induction motor is usually not a winding at all, but rather a cast rotor assembly.

As used herein, the term “bus bar” refers to a conductor used to connect two or more circuits. A bus bar can be made of a conductive material, such as copper or aluminum.

As used herein, the term “wound motor” refers to a motor with the rotor wound into definite poles.

As used herein, the term “inverter” refers to a circuit or other device which converts direct current (DC) power to alternating current (AC) power, usually with an increase in voltage. For example, an inverter can convert low voltage DC electricity produced by a fuel cell (or other source) to high voltage AC power for use by a motor.

As used herein, the term "bolt" refers to a device used to fasten, join, grip, support, or compress a thing together. For example, a bolt can be implemented as a threaded fastener, with a head, designed to be used in conjunction with a nut for fastening something together. Alternatively, a bolt can be a cap screw with captive lock and flat washer, or a pan-head screw with a captive sems-type spring washer.

As used herein, the term "Y capacitor" refers to a capacitor with increased electrical and mechanical reliability and limited capacitance. The increased electrical and mechanical reliability can reduce the likelihood of short circuits in the capacitor. Limitation of the capacitance can reduce the current passing through the capacitor when an ac voltage is applied and can reduce the energy content of the capacitor to a limit which is less dangerous when DC voltage is applied.

As used herein, the term "spring clip" refers to a self-retaining fastener which slips into a mounting hole or onto a flange. A spring clip is held by spring tension. In one embodiment, a spring clip is used to electrically connect a battery to an EMI filter card assembly to eliminate the need for other fasteners. In this embodiment, the spring clip provides a low resistance electrical connection by spring tension between battery input and filter components on emi filter card. Emi filter card completes circuit to ground.

As used herein, the term "Faraday cage" refers to an apparatus designed to prevent passage of electromagnetic waves by either containing them in or excluding them from its interior space. In one implementation, a Faraday cage can be a conductive enclosure which attenuates an electrostatic field and shields against radio wave interference. In one implementation, a Faraday cage can provide electrostatic shielding without affecting electromagnetic waves. A "Faraday cage" is sometimes also known as Faraday Shield or Faraday Screen.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Overview

A low noise inverter system is provided comprising an inverter module, a bus bar, and a connector for coupling the bus bar to the inverter module. The connector comprises a filter assembly which can receive an input having a noise component, and can filter the noise component of the input to produce a filtered input. The input is typically a DC input from a DC power source, such as a battery, and has an EMI noise component. The bus bar can be coupled to the connector and can receive the filtered input. The inverter module can be coupled to the connector via the bus bar. The inverter module can receive the filtered input signal from the bus bar and can generate an AC output signal. In one embodiment, the inverter module comprises a chassis, and the bus bar can be coupled to the chassis via the filter assembly. The connector may optionally include an inductive core which can be coupled to the inverter module via bus bar. In one implementation, the inductive core is disposed around at least a portion of the bus bar, and is coupled to the filter assembly via the bus bar.

In one implementation, the filter assembly comprises a connector pin and a Faraday cage interface. The connector pin can be coupled to the bus bar, and can receive the input having the noise component. The Faraday cage interface may be disposed at least partially around the connector pin to reduce the noise component associated with the input and to reduce the noise component radiating from the connector pin to the inverter module. In another implementation, the Faraday cage interface also includes a spring clip and a filter card. The spring clip at least partially surrounds at least a portion of the connector pin, and the filter card can be secured between the chassis and the bus bar. The spring clip and the filter card can be disposed between the bus bar and chassis, and the bus bar can be coupled to at least a portion of the chassis. The filter card may comprise a circuit board having a plurality of capacitors mounted thereon. In this case, the spring clip electrically couples the connector pin to the capacitors.

Thus, a compact inverter module can be provided which includes an integrated EMI filter assembly which includes a Faraday cage interface. The Faraday cage interface is configured to prevent passage of electromagnetic waves and filter electrical or EMI noise. This module can be useful, for example, in high power, high current applications.

Exemplary System

Figure 2:
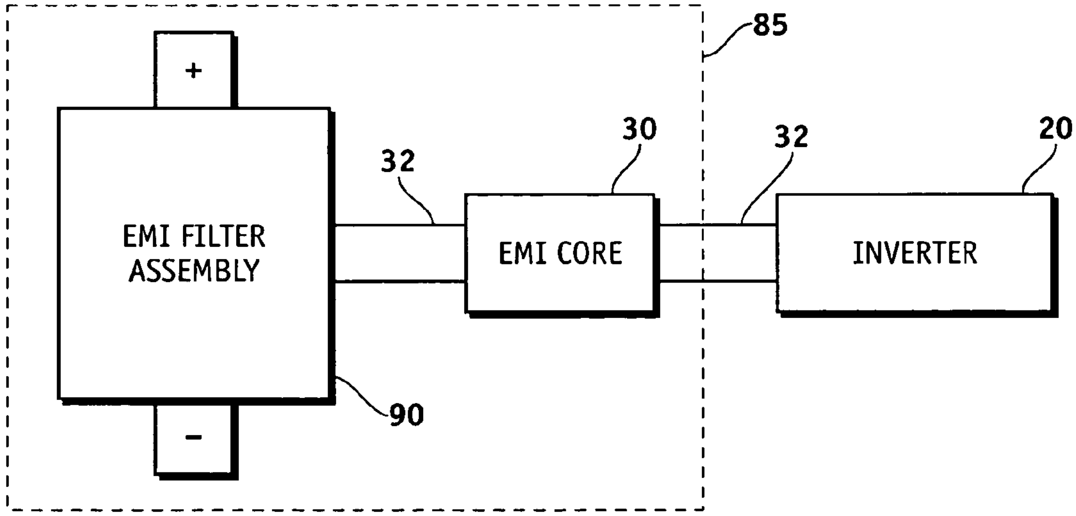
FIG. 2 is block diagram of an inverter system which implements a low EMI noise connection system for coupling bus bars to an inverter module according to one exemplary embodiment.

FIG. 2 is block diagram of an inverter system which implements a low EMI noise connection system 85 for coupling bus bars 32 to an inverter module 20. The inverter module 20 is coupled to the low EMI noise connection system 85 via bus bars 32.

The low EMI noise connection system 85 comprises an EMI core 30 and an integrated EMI filter assembly 90. The inverter module 20 is coupled to the EMI core 30 via bus bars 32. The EMI core 30 is integrated to or around the bus bars 32, and is also coupled to the EMI filter assembly 90 via the bus bars 32. The EMI core 30 comprises an inductor which can be used to absorb or filter the electrical switching noise and thereby reduce the susceptibility of other parts to electrical switching noise. The EMI core 30 may comprise, for example, a ferrite or other similar material.

The integrated EMI filter assembly 90 can receive a DC input across the + and − terminals, such as a DC wires, from a battery (not shown). This DC input is communicated to the inverter module 20 over the bus bars 32. The inverter module 20 converts the DC input to an AC signal. As will now be described, the integrated EMI filter assembly 90 can reduce EMI noise on the DC input from the battery to the inverter module 20.

Figure 3:
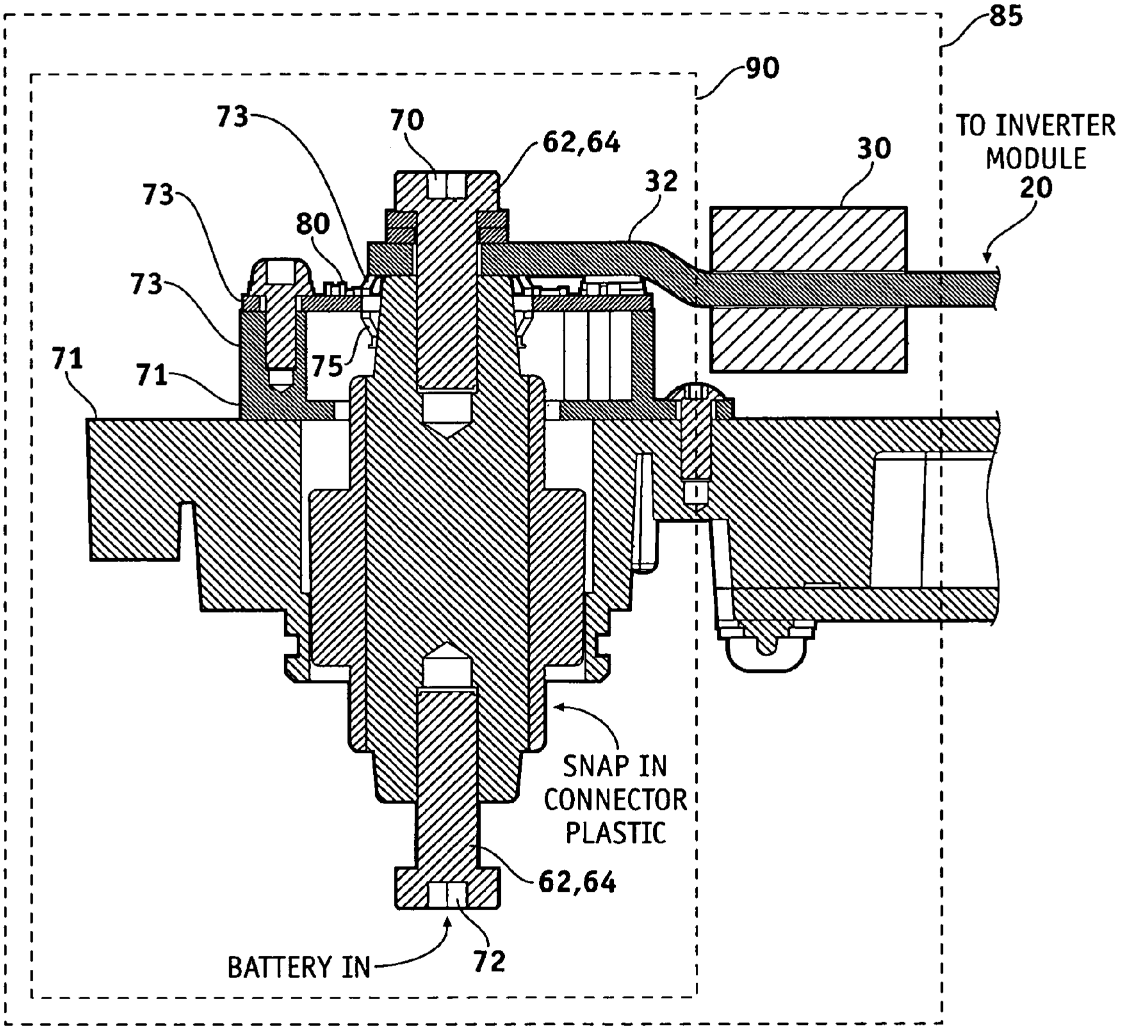
FIG. 3 is cut away cross sectional view of one exemplary implementation of the EMI filter assembly of FIG. 2.
Figure 4:
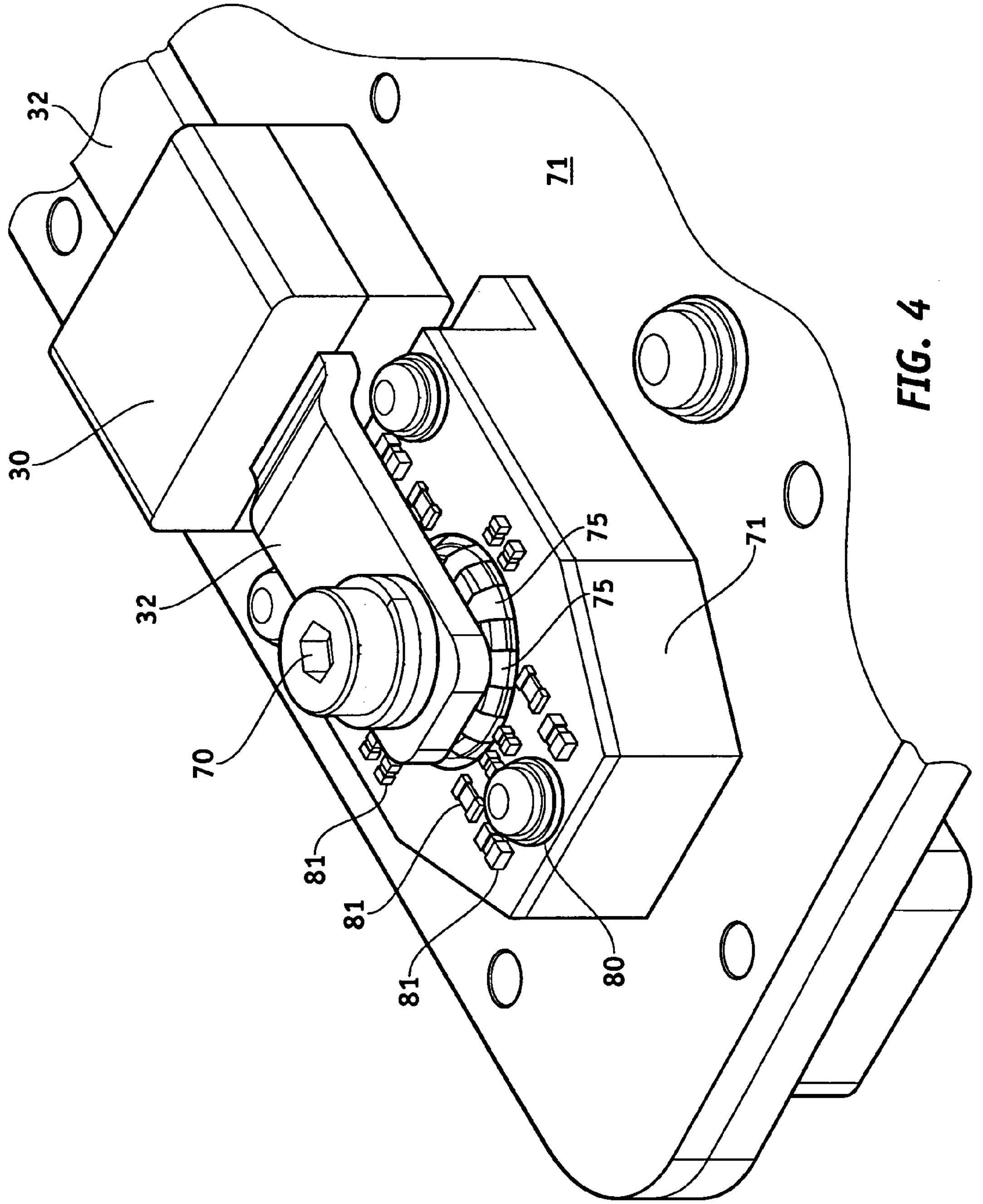
FIG. 4 is perspective view of one exemplary implementation of the EMI filter assembly of FIG. 2.

FIG. 3 is cut away cross sectional view of one exemplary implementation of the integrated EMI filter assembly 90 of FIG. 2. FIG. 4 is perspective view of one exemplary implementation of the integrated EMI filter assembly 90 of FIG. 3 with similar features labeled consistently. For sake of simplicity, FIGS. 2 and 3 show a single bus bar 32; however, it should be appreciated that multiple bus bars 32 could be coupled to either end to the integrated EMI filter assembly 90.

The low EMI noise connection system 85 is coupled to the inverter module 20 via bus bar 32. The low EMI noise connection system 85 comprises an EMI core 30 and an integrated EMI filter assembly 90.

The EMI core 30 interfaces to the snap-in connector pin 62 via the bus bar 32. The EMI core 30 surrounds at least a portion of bus bars 32, and the bus bar 32 extends through at least a portion of the EMI core 30. The bus bar 32 can be coupled, for example, to a chassis 71 of the inverter system by the integrated EMI filter assembly 90.

The integrated EMI filter assembly 90 comprises a pair of snap-in connector pins 62, 64, bolts (or other fasteners ) 70, 72, and a Faraday cage interface 73. The integrated EMI filter assembly 90 couples the bus bar 32 to at least a portion of the chassis 71 of the inverter system. The Faraday cage interface 73 is formed of at least the chassis 71, spring clips 75 and the EMI filter card 80.

The bolts 70, 72 serve as positive and negative terminals which can be connected to a DC power source (not shown), such as a battery. The bolts 70, 72 are coupled to the snap-in connector pins 62, 64 and can be used to secure the bus bar 32 to at least a portion of the chassis 71 of the inverter system. The bolts 70, 72 provide a path for DC power from the battery to the snap-in connector pins 62, 64. The bolts 70, 72 also secure the snap-in connector pins 62, 64 within the integrated EMI filter assembly 90. In one embodiment, the bolts 70,72 can screw or snap into the snap-in connector pins 62, 64.

The snap-in connector pins 62, 64 receive the DC input power from the bolts 70, 72, and carry the DC input power to the busbar 32 which is coupled to the EMI core 30 and the inverter module (not shown). The snap-in connector pin 62 and the bolt 70 secure the bus bar 32 to the chassis 71.

The spring clip 75 electrically connects the snap-in connector pin 62 to Y capacitors 81 on the EMI filter card 80 and connects the bus bar 32 to the EMI filter card 80 of the inverter system. The spring clip 75 is disposed underneath the bus bar 32 and keeps the EMI filter card 80 tight to the chassis 71 of the inverter system.

The EMI filter card 80 can have a plurality of Y capacitors 81 mounted thereon. In one embodiment, the EMI filter card 80 may be implemented as a circuit board which has Y capacitors 81 mounted thereon. The Y capacitors 81 are coupled between the battery in terminal and ground. The EMI filter card 80 can be secured via bolt 70 (and possibly other fasteners) directly to the chassis 71. By integrating the EMI filter card 80 on the chassis 71, wires 34 of FIG. 1 can be eliminated, and a short, low impedance connection is provided between the EMI filter card 80 and the chassis 71 of the inverter.

As described above, the EMI filter card 81 can be directly secured between the chassis 71 and the bus bar 32 via bolt 70 and possibly other fasteners. At least a portion of the snap-in connector pins 62, 64 are also enclosed in or surrounded by the spring clip 75. Because the spring clip 75 and the EMI filter card 81 are disposed between the bus bar 32 and chassis 71, the chassis 71, the spring clip 75 and the EMI filter card 81 form a "Faraday cage interface" 73 around snap-in connector pin 62. An integrated EMI filter 90 implementing this Faraday cage interface 73 (on the input of a switching supply) can tend to reduce and/or prevent the effect of EMI noise associated with the snap-in connector pin 62, 64 and to reduce the EMI noise radiating from the connector pin. The Faraday cage interface 73 can directly filter EMI noise associated with the snap-in connector pin 62, 64 and thereby helps to reduce or prevent EMI noise from radiating to the inverter module 20 from the snap-in connector pin 62, 64.

Thus, a compact, low cost low EMI noise connection system for coupling bus bars 32 to an inverter module 20 is provided with a reduced number of parts and improved reliability. This tends to reduce and/or minimize both the cost and size of the inverter module 20. In addition, EMI noise tends to be reduced on the high voltage, high current DC links which feed the inverter module 20 and reduces EMI noise which radiates from the connector pin.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments.

It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein. Numerical ordinals such as "first," "second," "third," etc. simply denote different singles of a plurality and do not imply any order or sequence unless specifically defined by the claim language.

What is claimed is:

1. A low noise inverter system, comprising:

a battery;

a bus bar;

an inverter module directly coupled to the bus bar; and a connector comprising:

a connector pin directly coupled to the bus bar and directly coupled to the battery, wherein the connector pin is configured to receive an input signal having a noise component from the battery and to provide a filtered input signal to the inverter module via the bus bar; and a Faraday cage interface disposed at least partially around the connector pin to reduce electromagnetic interference caused by the noise component and to reduce electromagnetic interference radiating from the connector pin to the inverter module, wherein the Faraday cage interface comprises: a chassis; a spring clip which at least partially surrounds at least a portion of the connector pin and a filter card secured between the chassis and the bus bar.

2. The system of claim 1, wherein the Faraday cage interface directly couples the bus bar to the chassis.

3. The system of claim 2, wherein the spring clip and the filter card are disposed between the bus bar and chassis, and wherein the bus bar is coupled to at least a portion of the chassis.

4. The system of claim 3, wherein the filter card comprises: a circuit board having a plurality of capacitors mounted thereon, wherein the spring clip electrically couples the connector pin to the circuit board.

5. The system of claim 2, wherein the filter assembly, further comprises:

a bolt configured to couple the input to the connector pin and to secure the bus bar to at least a portion of the chassis.

6. The system of claim 5, wherein the spring clip and bolt secure the filter card to the chassis.

7. The system of claim 1, wherein the input signal is a DC input signal from a DC power source having an EMI noise component.

8. The system of claim 1, wherein the connector further comprises:

an inductive core coupled to the inverter module via bus bar, wherein the inductive core is disposed around at least a portion of the bus bar, and wherein the inductive core is coupled to the filter assembly via the bus bar.

9. A filter assembly for coupling a bus bar to at least a portion of a chassis, comprising:

a connector pin directly coupled to the bus bar and directly coupled to a battery, the connector pin configured to receive a DC input signal having a noise component from the battery, and to provide a filtered input signal to the bus bar; and a Faraday cage interface disposed at least partially around the connector pin to reduce electromagnetic interference caused by the noise component and to reduce electromagnetic interference radiating from the connector pin, wherein the Faraday cage interface comprises: the chassis a spring clip which at least partially surrounds at least a portion of the connector pin; and a filter card secured between the chassis and the bus bar.

10. The filter assembly of claim 9, wherein the filter card comprises:

a circuit board having a plurality of capacitors mounted thereon, wherein the spring clip electrically couples the connector pin to the circuit board.

11. The filter assembly of claim 9, further comprising:

a bolt configured to couple the input to the connector pin.

12. The filter assembly of claim 9, wherein the DC input signal has an EMI noise component.

13. The filter assembly of claim 11, wherein the filter card is secured to the chassis by the spring clip and bolt.

14. The filter assembly of claim 13, wherein the bolt is configured to secure the bus bar to at least a portion of the chassis.

* * * * *